US012664975B2

(12) United States Patent
Mohamadabadi et al.

(10) Patent No.: US 12,664,975 B2
(45) Date of Patent: Jun. 23, 2026

(54) SYSTEMS AND METHODS FOR TRAINING ARTIFICIAL NEURAL NETWORKS

(71) Applicant: Samsung Electronics Co., Ltd., Suwon-si (KR)

(72) Inventors: Behnam Babagholami Mohamadabadi, Escondido, CA (US); Mostafa El-Khamy, San Diego, CA (US); Kee-Bong Song, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 18/371,289

(22) Filed: Sep. 21, 2023

(65) Prior Publication Data

US 2024/0355320 A1 Oct. 24, 2024

Related U.S. Application Data

(60) Provisional application No. 63/460,577, filed on Apr. 19, 2023.

(51) Int. Cl.
*G10L 15/06* (2013.01)
*G10L 15/16* (2006.01)
*G10L 15/20* (2006.01)

(52) U.S. Cl.
CPC ............ *G10L 15/063* (2013.01); *G10L 15/16* (2013.01); *G10L 15/20* (2013.01)

(58) Field of Classification Search
CPC ........ G10L 15/063; G10L 15/16; G10L 15/20
See application file for complete search history.

(56) References Cited

U.S. PATENT DOCUMENTS

| | | | |
|---|---|---|---|
| 10,529,317 B2 | 1/2020 | Lee et al. | |
| 11,551,083 B2 | 1/2023 | Li et al. | |
| 2021/0151069 A1* | 5/2021 | Hijazi | G06N 3/084 |
| 2022/0067274 A1* | 3/2022 | Wang | G06N 3/08 |

(Continued)

FOREIGN PATENT DOCUMENTS

| | | |
|---|---|---|
| CN | 114067819 A | 2/2022 |
| CN | 113314107 B | 10/2022 |
| CN | 115273874 A | 11/2022 |

OTHER PUBLICATIONS

Anonymous, "Manifold Mixup: Learning Better Representations by Interpolating Hidden States," ICLR, 2019, 26 pages.

(Continued)

*Primary Examiner* — Linda Wong
(74) *Attorney, Agent, or Firm* — Womble Bond Dickinson (US) LLP

(57) ABSTRACT

A system including: one or more processors; and memory including instructions that, when executed by the one or more processors, cause the one or more processors to: generate augmented input data by mixing noise components of training data; train a first neural network based on the augmented input data and ground truth data of the training data to output a first prediction of clean speech; lock trainable parameters of the first neural network as a result of the training of the first neural network; and train a second neural network according to the augmented input data and predictions of the first neural network to output a second prediction of the clean speech.

20 Claims, 14 Drawing Sheets

(56)          References Cited

U.S. PATENT DOCUMENTS

| | | | |
|---|---|---|---|
| 2022/0180882 A1* | 6/2022 | Wang | G10L 19/06 |
| 2022/0237890 A1* | 7/2022 | Choi | G06N 3/088 |
| 2023/0033768 A1* | 2/2023 | Chong | G10L 25/84 |
| 2023/0169977 A1* | 6/2023 | Kawaguchi | G10L 15/02 |
| | | | 704/235 |

OTHER PUBLICATIONS

Hao, Xiang, et al., "Sub-band Knowledge Distillation Framework for Speech Enhancement," INTERSPEECH 2020, Oct. 2020, pp. 2687-2691.

Sau, Bharat Bhusan, et al., "Deep Model Compression: Distilling Knowledge from Noisy Teachers," arXiv:1610.09650, 2016, 9 pages.

Zhang, Hongyi, et al., "Mixup: Beyond Empirical Risk Minimization," ICLR, 2018, 13 pages.

* cited by examiner

| Model | # trainable params(K) | # channels | PESQ | STOI | CSIG | CBAK | COVL | SSNR |
|---|---|---|---|---|---|---|---|---|
| Large-CMGAN | 1830 | 64 | 3.40 | 0.95 | 4.64 | 3.93 | 4.12 | 10.99 |
| Large-CMGAN + Noise Mixup | 1830 | 64 | 3.51 | 0.96 | 4.69 | 3.98 | 4.21 | 11.05 |
| | | | | | | | | |
| Tiny-CMGAN | 149 | 16 | 3.21 | 0.94 | 4.50 | 3.71 | 3.92 | 9.90 |
| Tiny-CMGAN + Noise Mixup | 149 | 16 | 3.29 | 0.95 | 4.59 | 3.82 | 4.02 | 10.25 |
| Tiny-CMGAN + Kd loss | 149 | 16 | 3.24 | 0.95 | 4.55 | 3.81 | 3.98 | 10.37 |
| Tiny-CMGAN + Kd loss + Noise Mixup | 149 | 16 | 3.31 | 0.95 | 4.60 | 3.85 | 4.04 | 10.45 |
| | | | | | | | | |
| Super-Tiny-CMGAN | 93 | 12 | 3.10 | 0.94 | 4.52 | 3.71 | 3.88 | 9.80 |
| Super-Tiny-CMGAN + Noise Mixup | 93 | 12 | 3.20 | 0.95 | 4.53 | 3.75 | 3.95 | 10.00 |
| Super-Tiny-CMGAN + Kd loss | 93 | 12 | 3.18 | 0.95 | 4.51 | 3.76 | 3.93 | 10.04 |
| Super-Tiny-CMGAN + Kd loss + Noise Mixup | 93 | 12 | 3.23 | 0.95 | 4.56 | 3.79 | 3.98 | 10.05 |

FIG. 8

SYSTEMS AND METHODS FOR TRAINING ARTIFICIAL NEURAL NETWORKS

CROSS-REFERENCE TO RELATED APPLICATION

This application claims priority to and the benefit of U.S. Provisional Application No. 63/460,577, filed on Apr. 19, 2023, the entire disclosure of which is incorporated by reference herein.

BACKGROUND

1. Field

Aspects of one or more embodiments of the present disclosure relate to systems and methods for training artificial neural networks, for example, such as on speech enhancement tasks.

2. Description of Related Art

Speech enhancement aims to improve speech quality by using various algorithms. Generally, the objective of the enhancement is the improvement in intelligibility and/or overall perceptual quality of a degraded speech signal using audio signal processing techniques.

The above information disclosed in this Background section is for enhancement of understanding of the background of the present disclosure, and therefore, it may contain information that does not constitute prior art.

SUMMARY

Typically, speech enhancement (SE) algorithms based on deep neural networks (DNNs) may encounter challenges due to limited hardware resources and/or strict latency requirements when deployed in real world scenarios. However, in order to provide a strong enhancement effect, a large DNN (e.g., in terms of parameters or weights) may typically be required, which may limit its application in and/or availability for various small and medium sized electronic devices, for example, such as mobile phones, smart phones, wearable devices, hearing aids, and the like.

One or more embodiments of the present disclosure may be directed to systems and methods for data augmentation to generate augmented data that may be used to sufficiently train an artificial neural network system having a reduced number of parameters or weights (e.g., a compressed DNN model).

One or more embodiments of the present disclosure may be directed to systems and methods for knowledge distillation between a larger artificial neural network and a compressed, smaller artificial neural network in terms of parameters or weights.

According to one or more embodiments of the present disclosure, a system includes: one or more processors; and memory comprising instructions that, when executed by the one or more processors, cause the one or more processors to: generate augmented input data by mixing noise components of training data; train the first neural network based on the augmented input data and ground truth data of the training data to output a first prediction of clean speech; lock trainable parameters of the first neural network as a result of the training of the first neural network; and train a second neural network according to the augmented input data and predictions of the first neural network to output a second prediction of the clean speech.

In an embodiment, a number of trainable parameters in the second neural network may be smaller than a number of the trainable parameters in the first neural network.

In an embodiment, the first neural network may be trained according to a first loss function and a second loss function.

In an embodiment, the second loss function may be based on the first loss function and a hyper-parameter that may define an extent of the mixing of the noise components of the training data.

In an embodiment, the second neural network may be trained according to a third loss function different from the first and second loss functions.

In an embodiment, to train the second neural network, the instructions further cause the one or more processors to mix intermediate features of input data at a hidden layer of each of the first and second neural networks to generate a batch of mixed intermediate features of the input data for each of the first and second neural networks.

In an embodiment, to train the second neural network, the instructions further cause the one or more processors to continue a forward pass from the hidden layer of each of the first and second neural networks to a corresponding output of each of the first and second neural networks using the batch of mixed intermediate features.

In an embodiment, to train the second neural network, the instructions further cause the one or more processors to: calculate a loss between the corresponding output of the second neural network and the corresponding output of the first neural network, based on the mixed batch of intermediate features; and adjust trainable parameters of the second neural network based on the loss.

According to one or more embodiments of the present disclosure, a method includes: generating, by one or more processors, augmented input data by mixing noise components of training data; training, by the one or more processors, a first neural network based on the augmented input data and ground truth data of the training data to output a first prediction of clean speech; locking, by the one or more processors, trainable parameters of the first neural network as a result of the training of the first neural network; and training, by the one or more processors, a second neural network according to the augmented input data and predictions of the first neural network to output a second prediction of the clean speech.

In an embodiment, a number of trainable parameters in the second neural network may be smaller than a number of the trainable parameters in the first neural network.

In an embodiment, the first neural network may be trained according to a first loss function and a second loss function.

In an embodiment, the second loss function may be based on the first loss function and a hyper-parameter that may define an extent of the mixing of the noise components of the training data.

In an embodiment, the second neural network may be trained according to a third loss function different from the first and second loss functions.

In an embodiment, to train the second neural network, the method may further include mixing, by the one or more processors, intermediate features of input data at a hidden layer of each of the first and second neural networks to generate a batch of mixed intermediate features of the input data for each of the first and second neural networks.

In an embodiment, to train the second neural network, the method may further include continuing, by the one or more processors, a forward pass from the hidden layer of each of the first and second neural networks to a corresponding output of each of the first and second neural networks using the batch of mixed intermediate features.

In an embodiment, to train the second neural network, the method may further include: calculating, by the one or more processors, a loss between the corresponding output of the second neural network and the corresponding output of the first neural network, based on the mixed batch of intermediate features; and adjusting, by the one or more processors, trainable parameters of the second neural network based on the loss.

According to one or more embodiments of the present disclosure, a computer-readable medium storing instructions is provided. The instructions, when executed by one or more processors, cause the one or more processors to perform a method including: generating augmented input data by mixing noise components of training data; training a first neural network based on the augmented input data and ground truth data of the training data to output a first prediction of clean speech; locking trainable parameters of the first neural network as a result of the training of the first neural network; and training a second neural network according to the augmented input data and predictions of the first neural network to output a second prediction of the clean speech.

In an embodiment, to train the second neural network, the instructions may further cause the one or more processors to perform the method including mixing the augmented input data in a hidden layer of each of the first and second neural networks to generate a mixed batch of intermediate features of the augmented input data.

In an embodiment, to train the second neural network, the instructions may further cause the one or more processors to perform the method including continuing a forward pass from the hidden layer of each of the first and second neural networks to a corresponding output of each of the first and second neural networks using the mixed batch of intermediate features.

In an embodiment, to train the second neural network, the instructions may further cause the one or more processors to perform the method including: calculating a loss between the corresponding output of the second neural network and the corresponding output of the first neural network, based on the mixed batch of intermediate features; and adjusting trainable parameters of the second neural network based on the loss.

BRIEF DESCRIPTION OF THE DRAWINGS

The above and other aspects and features of the present disclosure will be more clearly understood from the following detailed description of the illustrative, non-limiting embodiments with reference to the accompanying drawings, in which:

FIG. 8 is a table illustrating experimental results of a knowledge distillation artificial neural network system according to an embodiment;

DETAILED DESCRIPTION

Figure 1A:
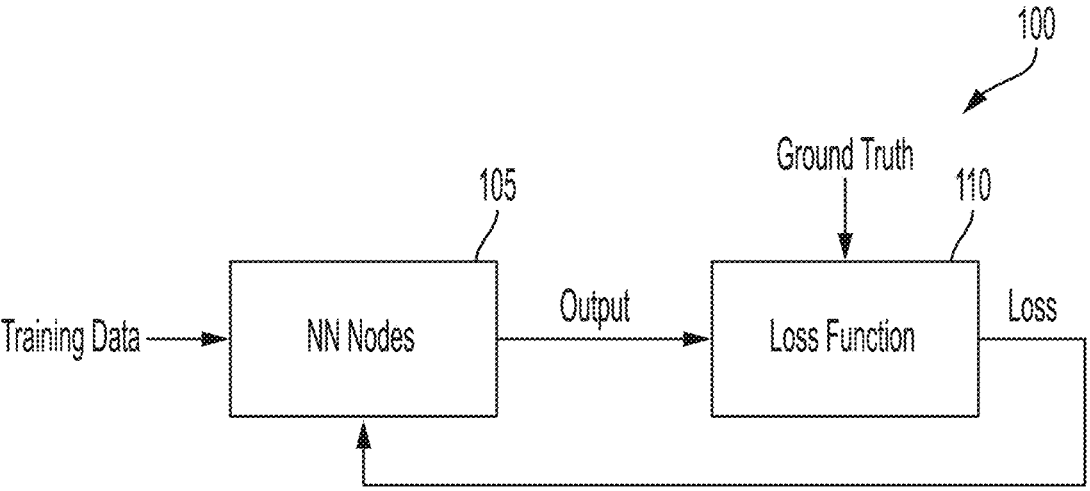
FIG. 1A is a diagram of an artificial neural network system during training.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Generally, the goal of a speech enhancement task is to process a noisy speech input signal and provide an estimate of clean speech. The performance of such systems may be measured in terms of intelligibility and/or quality of the estimated clean signal (e.g., using objective metrics, such as spectro-temporal objective intelligibility (STOI), perceptual evaluation of speech quality (PESQ), and/or the like). Speech enhancement may be desired for mobile phones, smart phones, wearable devices, hearing aids, and the like for the improvement in speech communications.

However, some applications may require low-latency processing (e.g., the delay between the estimated clean signal in relation to the noisy signal cannot be too large). For example, if the latency is too long, it may not result in an improvement in speech communications. Moreover, in some real-world applications, speech enhancement algorithms may be constrained by the capabilities of the hardware (e.g., the mobile hardware).

Artificial neural networks, such as deep neural networks (DNNs), may be an effective means for speech enhancement tasks. To further enhance their performance, many research efforts have focused on designing better network architectures for specific tasks. While improving the architectures may deliver better performance, these methods tend to overfit easily, and require large amounts of training data. As such, a larger artificial neural network model in terms of parameters or weights may typically be required to make suitable predictions (e.g., estimation of clean speech). For example, the more parameters or weights that are included, the more nodes (e.g., neurons) or connections therebetween may be needed in the artificial neural network model, thus, increasing the overall processing resources required for the model. Thus, data augmentation and regularization strategies have been explored.

In the case of speech enhancement, in order to augment audio datasets, two main approaches have been explored: time-domain waveforms and time-frequency domain features (e.g., spectrogram, mel-spectrogram, and melfrequency cepstral coefficient). Because the time-frequency domain features are two dimensional and can be projected as a 2D image, data augmentation strategies, for example, such as Mixed Sample Data Augmentation (MSDA) type in the computer vision domain, may be applied to the time-frequency domain features. Typically, such mixing strategies may blend two images (e.g., spectrograms) of audio features and labels by varying a random parameter. While the performance of such mixing strategies may be effective in image classification tasks, due to the way it mixes magnitudes (e.g., including both the clean and noise components or signals) of spectrograms from different source components together, it may be difficult to disentangle them in the audio domain.

According to one or more embodiments of the present disclosure, systems and methods may be provided to train an artificial neural network based on augmented input data, in which noise spectrograms of the samples are combined (e.g., are mixed) with each other, rather than combining (e.g., mixing) the entire noisy spectrograms (e.g., including the clean signal and noise signal) of the samples with each other, and using the augmented input data to train or retrain the artificial neural network with time-frequency domain features. Accordingly, more training data may be easily generated (e.g., based on previous training data and corresponding ground truth data) and used to train the artificial neural network, and thus, performance on the predictions (e.g., speech enhancement tasks) by the artificial neural network for live data (e.g., during inference) may be improved.

According to one or more embodiments of the present disclosure, systems and methods may be provided to train an artificial neural network (e.g., a compressed artificial neural network in terms of parameters or weights) using knowledge distilled from a larger, fully trained artificial neural network. For example, in some embodiments, once a larger pretrained artificial neural network has been re-trained based on the augmented input data, its parameters (e.g., weights) may be locked (e.g., may be frozen), and the predictions generated by the larger artificial neural network may be used as a kind of ground truth data to train the compressed artificial neural network based on the same augmented input data.

Accordingly, in some embodiments, a smaller, compressed artificial neural network may be sufficiently trained based on knowledge distilled from a larger, fully trained artificial neural network based on the augmented input data, such that training data needed by the smaller artificial neural network may be reduced, a training time may be reduced, the number of parameters or weights needed by the smaller artificial neural network to make suitable predictions may be reduced, and latency may be reduced. As such, a sufficiently trained smaller artificial neural network model in terms of weights or parameters may be provided for use in various suitable applications and electronic devices, for example, such as those having limited hardware resources and/or strict latency requirements as described above.

The above and other aspects and features of the present disclosure will now be described in more detail hereinafter with reference to the figures. While some aspects and features of the present disclosure have been described above and in more detail hereinafter, the present disclosure is not limited thereto. Additional aspects and features will be set forth, in part, in the description that follows, and in part, may be apparent from the description, or may be learned by practicing one or more of the presented embodiments of the present disclosure.

Figure 1B:
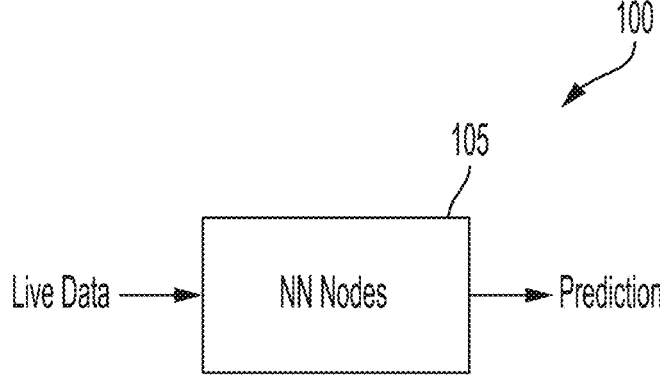
FIG. 1B is a diagram of an artificial neural network system during inference.

FIG. 1A is a diagram of an artificial neural network system during training, and FIG. 1B is a diagram of the artificial neural network system during inference.

Referring to FIGS. 1A and 1B, an artificial neural network system 100 may include one or more processing circuits including one or more processors and memory. Each of the processors may be a general-purpose processor or specific-purpose processor, an application specific integrated circuit (ASIC), one or more field programmable gate arrays (FPGAs), a group of processing components, or other suitable processing components. Each of the processors may be integrated within a single device or distributed across multiple separate systems, servers, or devices (e.g., computers). For example, each of the processors may be an internal processor with respect to the artificial neural network system 100, or one or more of the processors may be an external processor, for example, implemented as part of one or more servers or as a cloud-based computing system. Each of the processors may be configured to execute computer code or instructions stored in the memory, and/or received from other computer readable media (e.g., CDROM, network storage, a remote server, and/or the like).

The memory may include one or more devices (e.g., memory units, memory devices, storage devices, and/or the like) for storing data and/or computer code for performing and/or facilitating the various processes described in the present disclosure. The memory may include random access memory (RAM), read-only memory (ROM), hard drive storage, temporary storage, non-volatile memory, flash memory, optical memory, or any other suitable memory for storing software objects and/or computer instructions. The memory may include database components, object code components, script components, and/or any other kinds of information structures for supporting the various activities and information structures described in the present disclosure. The memory may be communicably connected to the one or more processors via the one or more processing circuits, and may include computer code for executing (e.g., by the one or more processors) one or more of the processes described herein.

The one or more processors and the memory of the artificial neural network system 100 may implement a plurality of neural network (NN) nodes or neurons 105 (e.g., DNN nodes or neurons) that are trained to output a prediction (e.g., a label of clean speech). The prediction (e.g., the label of clean speech) may then be used to output an audio signal corresponding to the clean speech, for example, in mobile phones, smart phones, wearable devices, hearing aids, and the like. However, the present disclosure is not limited thereto, and in other embodiments, the neural network nodes or neurons 105 may be trained to output, for example, a label of noisy data, and the clean speech may be extrapolated from the input based on the noisy data. During training, the neural network nodes 105 may output the prediction based on training data, and the one or more processors may calculate a loss based on a loss function 110 between a ground truth (e.g., a ground truth label) of the training data and the output (e.g., the output label) from the neural network nodes 105. As illustrated in FIG. 1A, the calculated loss may be used to adjust parameters (e.g., weights) used by the neural network nodes 105 to output a suitable prediction that reduces or minimizes the loss calculated based on the loss function 110. As illustrated in FIG. 1B, once suitable parameters have been learned based on the training data and the loss function 110, the parameters may be locked or frozen during inference, such that the neural network nodes 105 output predictions for live data during inference based on the locked or frozen parameters learned during the training.

Figure 2A:
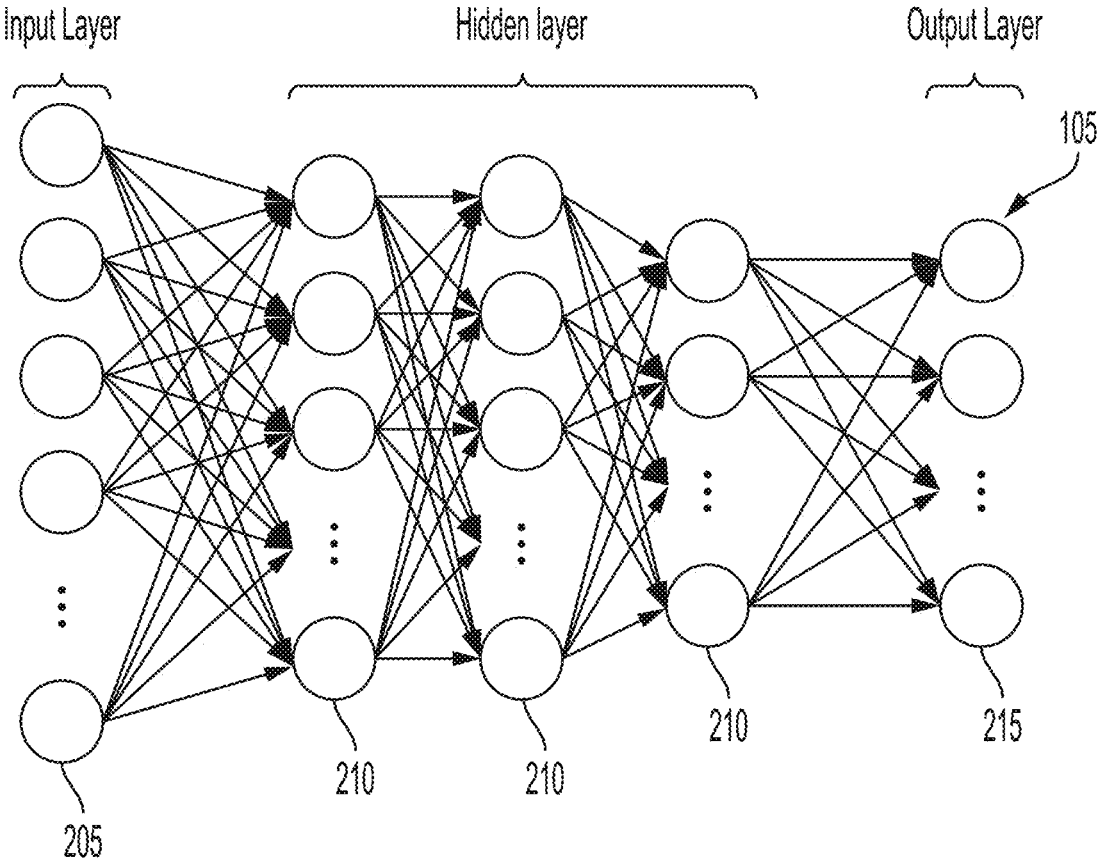
FIG. 2A is a diagram of an artificial neural network.
Figure 2B:
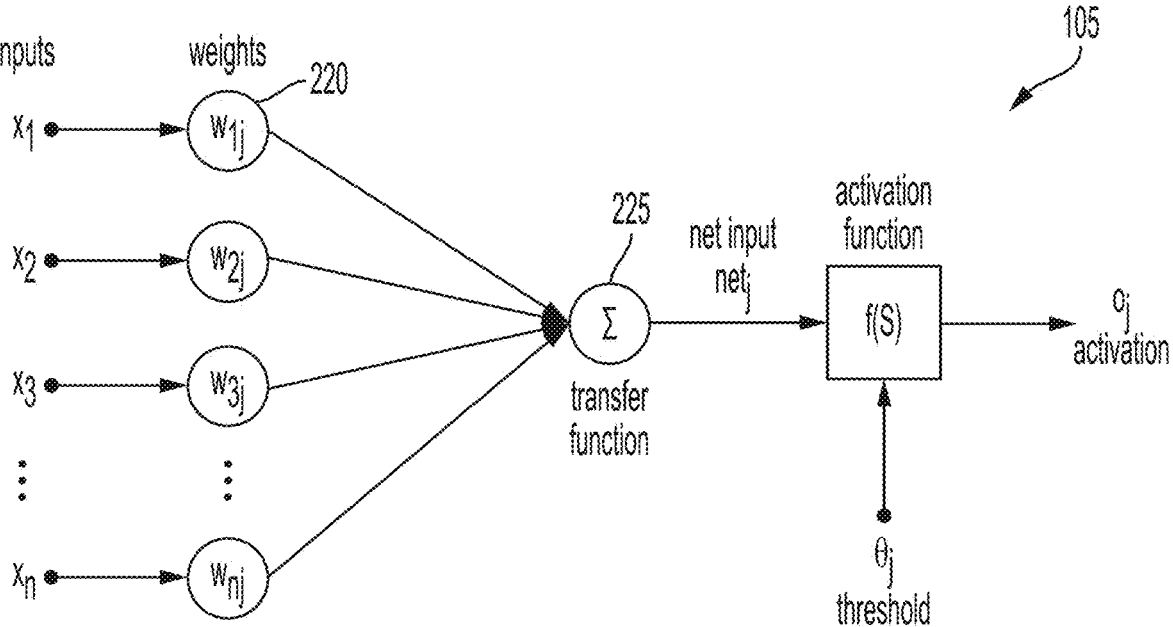
FIG. 2B is a diagram of a neuron of an artificial neural network.

FIG. 2A is a diagram of an artificial neural network, and FIG. 2B is a diagram of a neuron of the artificial neural network.

Referring to FIGS. 2A and 2B, the artificial neural network system includes a plurality of neural network nodes or neurons 105. The neural network nodes 105 form an input layer 205, one or more hidden layers 210, and an output layer 215. A plurality of connections may be formed between the neural network nodes 105, for example, as illustrated in FIG. 2A. A weighted sum (or "linear combination") of the inputs is formed (e.g., each input is multiplied by a respective weight or parameter 220, and the sum 225 of these products is formed) as illustrated in FIG. 2B. The weighted sum is processed by an activation function f(S), which may be any suitable nonlinear function (e.g., DNN function), for example, such as a nonlinear thresholding function.

Figure 3A:
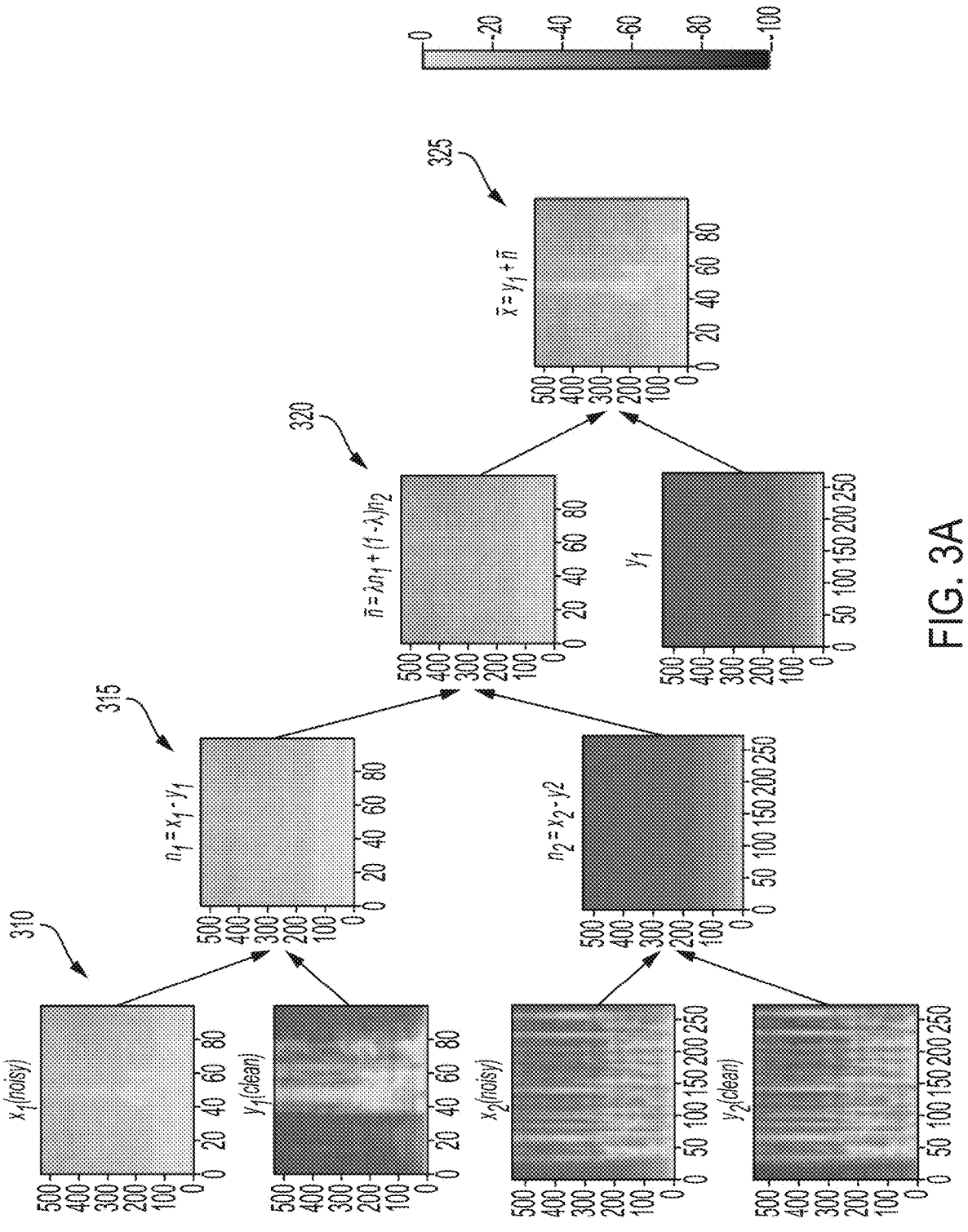
FIG. 3A is a diagram illustrating a method for data augmentation in an input space, according to an embodiment.
Figure 3B:
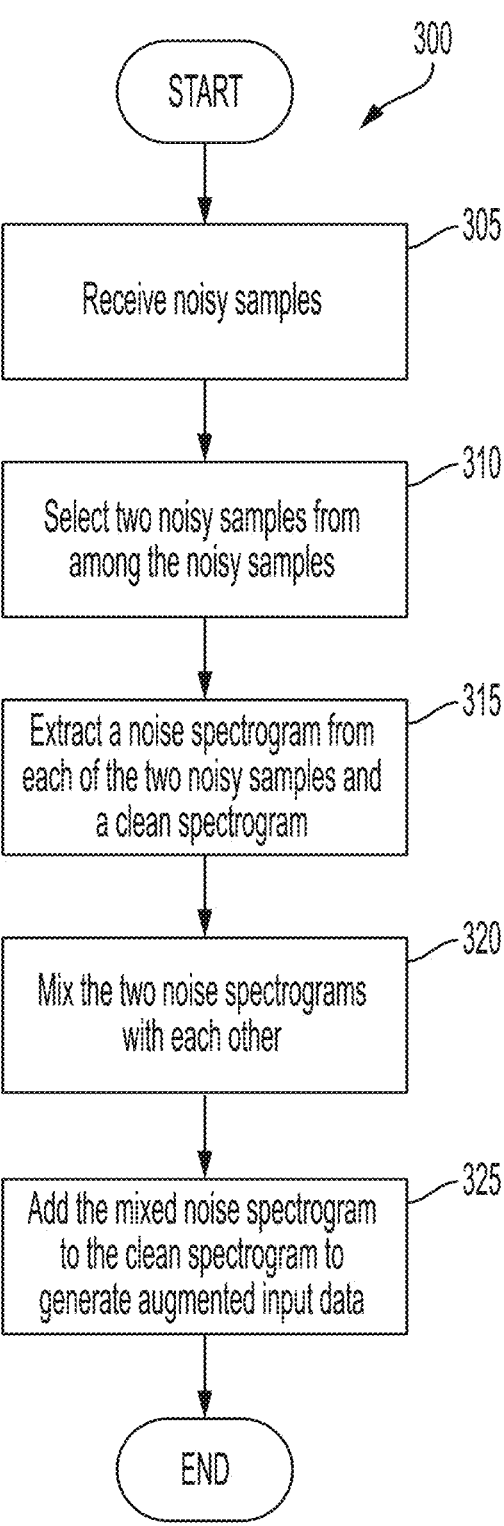
FIG. 3B is a flow chart of a method for data augmentation in an input space, according to an embodiment.
Figure 4A:
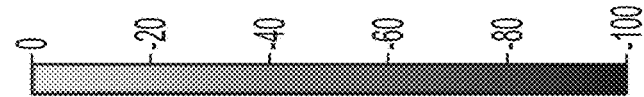
FIG. 4A is a diagram illustrating a method for data augmentation in an input space, according to an embodiment.

FIG. 3A is a diagram illustrating a method for data augmentation in an input space, according to an embodiment, and FIG. 3B is a flow chart of the method for data augmentation in an input space, according to an embodiment. FIG. 4A is a diagram illustrating a method for data augmentation in an input space, according to an embodiment, and FIG. 4B is a flowchart of the method for data augmentation in an input space, according to an embodiment.

According to one or more embodiments of the present disclosure, an artificial neural network system may be trained based on augmented data (e.g., augmented input data) in an input space (e.g., the input layer). The augmented input data may be generated by the one or more processors of the artificial neural network system 100 by mixing or combining the noise spectrograms (e.g., the noise components or signals) of the data samples, rather than mixing or combining the entire noisy spectrograms (e.g., including both the clean and noise components or signals) of the data samples. FIGS. 3A and 3B illustrate a case where only noisy samples (e.g., including both the clean and noise components or signals) are provided (e.g., without source noise data), for example, such as in the case of the "VoiceBank+ Demand" dataset, and FIGS. 4A and 4B illustrate a case where the source noise data (e.g., which already identifies the clean and noise components or signals) is also provided (e.g., in addition to or in lieu of the noisy samples), for example, such as in the case of the "DNS Challenge" dataset. For example, in the illustrated embodiments, the noisy samples and/or the source noise data may be provided based on the available ground truth data or by pre-preprocessing the available ground truth data, but the present disclosure is not limited thereto.

Figure 4B:
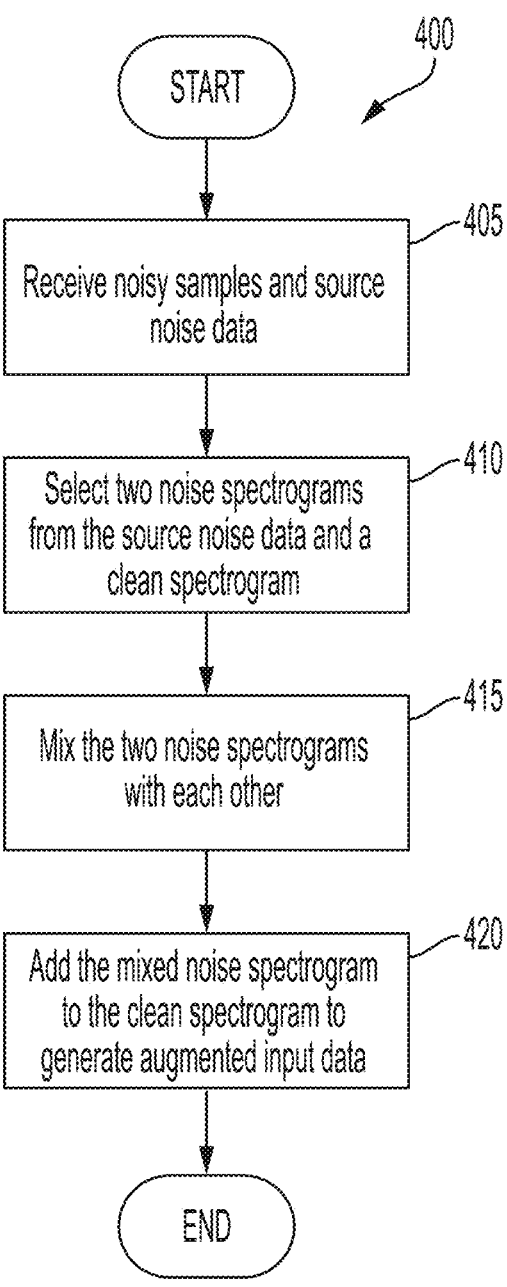
FIG. 4B is a flowchart of a method for data augmentation in an input space, according to an embodiment.

While FIG. 3B illustrates a method 300 and FIG. 4B illustrates a method 400, it should be appreciated that the methods 300 and 400 may be combined with each other as needed or desired depending on the available training data (e.g., the noisy samples, the source noise data, the ground truth data, and/or the like). For example, a device (e.g., one or more processors) may implement both the method 300 and the method 400 based on a determination operation of whether or not the source noise data is received. Moreover, the present disclosure is not limited to the sequence or number of the operations of the method 300 shown in FIG. 3 or the method 400 shown in FIG. 4, and can be altered into any desired sequence or number of operations as recognized by a person having ordinary skill in the art. For example, in some embodiments, the order may vary, some processes thereof may be performed concurrently or sequentially, or the methods 300 and 400 may include fewer or additional operations.

First, referring to FIGS. 3A and 3B, the method 300 may start, and noisy samples are received at block 305, but the source noise data may not be provided. For example, the noisy samples may be provided based on the available ground truth data, but the source noise data may not be indicated or determined from the available ground truth data. Two noisy samples (e.g., $x_1 = y_1 + n_1$, $x_2 = y_2 + n_2$) are selected from among the noisy samples at block 310, where $x_1$, $x_2 \in R^{FxTxC}$ are two noisy spectrograms (e.g., 2-D images) of the two noisy samples, $y_1$, $y_2 \in R^{FxTxC}$ are their corresponding clean spectrograms, and $n_1$, $n_2 \in R^{FxTxC}$ are their corresponding noise spectrograms. For example, in some embodiments, the two noisy samples (e.g., $x_1$, $x_2$) may be randomly selected from among the noisy samples received at block 305, but the present disclosure is not limited thereto.

A noise spectrogram (e.g., $n_1$, $n_2$) is extracted from each of the two noisy samples and a corresponding clean spectrogram (e.g., $y_1$) at block 315. The noise spectrograms (e.g., $n_1$, $n_2$) are mixed with each other at block 320. The mixed noise spectrogram (e.g., $\bar{n} = \lambda n_1 + (1-\lambda)n_2$) is added to the corresponding clean spectrogram (e.g., $y_1$) to generate augmented input data (e.g., $\bar{x} = y_1 + \bar{n}$) at block 325, and the method 300 may end.

With substitutions, the augmented input data (e.g., $\bar{x}$) may be defined based on Equation 1 below.

$$\bar{x} = h_\lambda(x_1, x_2) = y_1 + \lambda n_1 + (1-\lambda)n_2 \qquad \text{Equation 1}$$

In Equation 1, h is the mixing function and $\lambda$ is a hyper-parameter drawn from a Beta distribution (e.g., $\lambda \sim \text{Beta}(\alpha, \alpha)$, with control parameter $\alpha$). In more detail, the hyper-parameter $\lambda$ in Equation 1 may be used to specify the extent of the mixing. In other words, the control parameter $\alpha$ in the beta distribution Beta $(\alpha, \alpha)$ commands the strength of interpolation between the noise samples (e.g., a high $\alpha$ generating strongly interpolated).

Referring to FIGS. 4A and 4B, the method 400 may start, and noisy samples and source noise data are received at block 405. For example, the noisy samples and the source noise data may be provided based on the available ground truth data, but the present disclosure is not limited thereto. In this case, the source noise data may already identify the noise component (e.g., the noise spectrogram) and the clean component (e.g., the clean spectrogram) for each of the noisy samples, and thus, blocks 310 and 315 of the method 300 described above may be omitted. Two noise spectrograms (e.g., $n_1$, $n_2$) are selected from the source noise data and a corresponding clean spectrogram (e.g., $y_1$) at block 410. For example, in some embodiments, the two noise spectrograms (e.g., $n_1$, $n_2$) and the corresponding clean spectrogram (e.g., $y_1$) may be randomly selected, but the present disclosure is not limited thereto.

The noise spectrograms (e.g., $n_1$, $n_2$) are mixed with each other at block 415. The mixed noise spectrogram (e.g., $\bar{n} = \lambda n_1 + (1-\lambda)n_2$) is added to the corresponding clean spectrogram (e.g., $y_1$) to generate augmented input data (e.g., $\bar{x} = y_1 + \bar{n}$) at block 420, and the method 400 may end.

With substitutions, the augmented input data (e.g., $\bar{x}$) may be defined based on Equation 1 described above.

As can be seen from Equation 1 (e.g., $\bar{x} = y_1 + \lambda n_1 + (1-\lambda)n_2$), only the noise components (e.g., the noise spectrograms $n_1$, $n_2$) are combined to generate the augmented input data (e.g., $\bar{x}$), while a comparative example of a mixup data augmentation method combines the entire noisy samples, such as $\bar{x} = \lambda x_1 + (1-\lambda)x_2$.

According to one or more embodiments, the augmented input data (e.g., $\bar{x}$) may then be used to train an artificial neural network system. For example, by denoting $\mathcal{L}(f(x), y)$ as any suitable loss function, where $f$ denotes a DNN function (e.g., the activation function), the artificial neural network system may be trained based on the generated augmented input data by minimizing or reducing a noise-mix loss function $\mathcal{L}_{noiseMix}(f)$ shown in Equation 2 below.

$$\mathcal{L}_{noiseMix}(f) = \qquad \text{Equation 2}$$
$$\mathbb{E}_{x,y \sim P}\mathcal{L}(f(x), y) + \mathbb{E}_{x,y \sim P}\mathbb{E}_{x' \sim P}\mathbb{E}_{\lambda \sim Beta(\alpha, \alpha)}\mathcal{L}(f(h_\lambda(x, x')), y)$$

In Equation 2, P denotes the data distribution, and $\mathbb{E}$ denotes the expectation operator.

Figure 5:
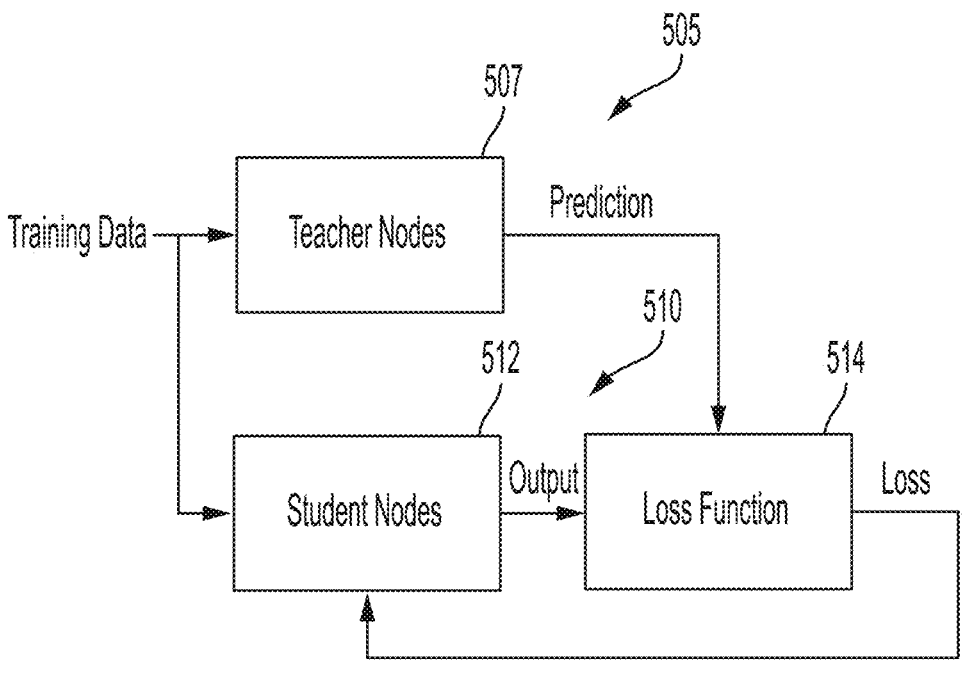
FIG. 5 is a system diagram of a knowledge distillation artificial neural network system, according to an embodiment.
Figure 6:
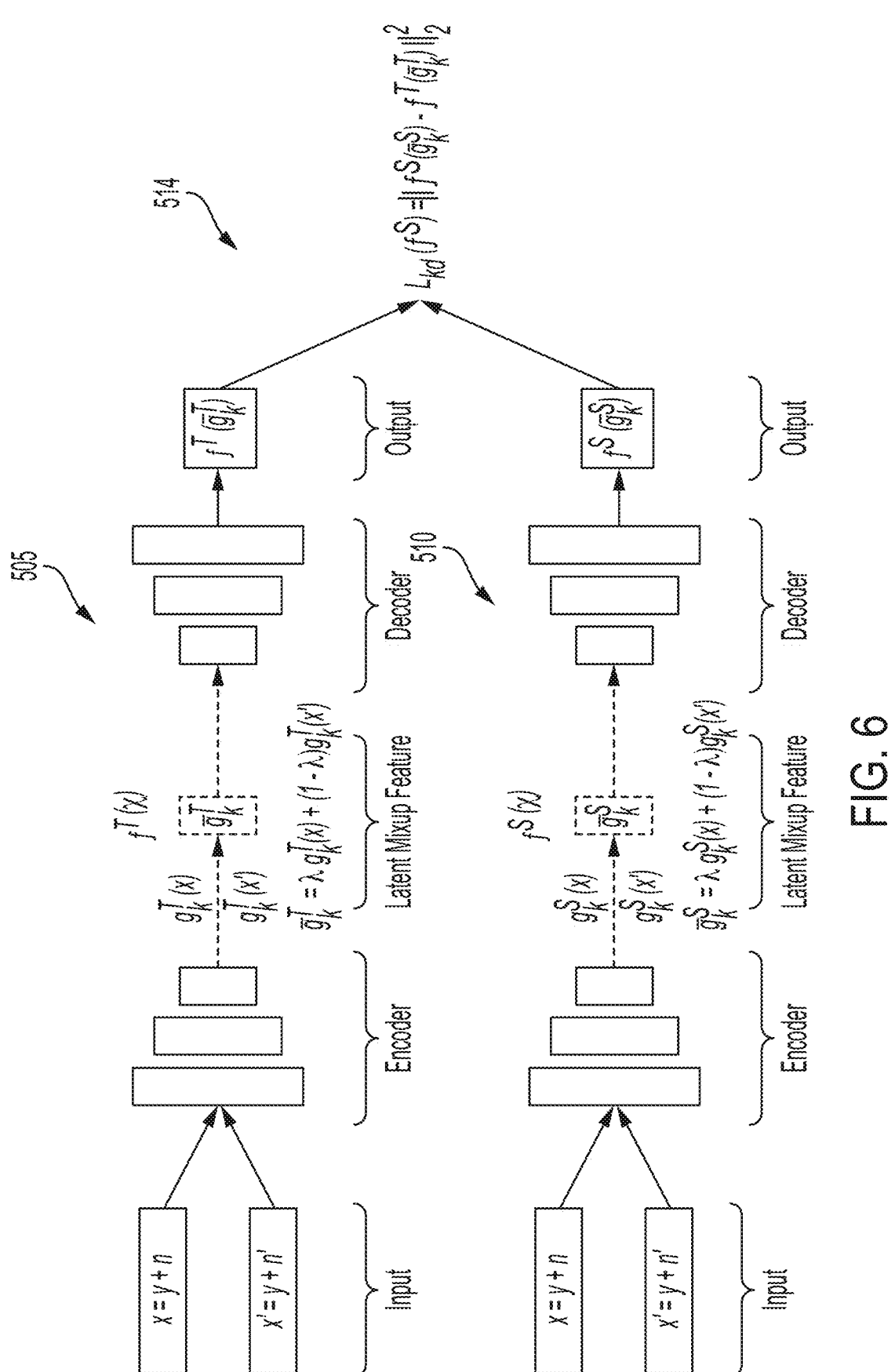
FIG. 6 is a diagram illustrating a method for knowledge distillation, according to an embodiment.

FIG. 5 is a system diagram of a knowledge distillation artificial neural network system, according to an embodiment. FIG. 6 is a diagram illustrating a method for knowledge distillation, according to an embodiment.

According to one or more embodiments of the present disclosure, to reduce the model size while preserving comparable performance, which narrows the gap between large artificial neural networks and small artificial neural networks, a knowledge distillation method may be used to exploit the ability to learn concise knowledge representation (e.g., logic or feature) from a larger model, and then embedding such knowledge into a smaller model.

Referring to FIG. 5, given a pre-trained teacher artificial neural network (e.g., a first artificial neural network) 505 on a data set (e.g., training data) in advance, a student artificial neural network (e.g., a second artificial neural network) 510 may be trained over the same set of data by utilizing concise knowledge (e.g., predictions) generated by the teacher network 505. In brief overview, once the teacher network 505 is sufficiently pretrained, the parameters or weights for its nodes or neurons (e.g., teacher nodes 507) are frozen (e.g., locked) during the knowledge distillation training, and then the nodes or neurons (e.g., student nodes 512) of the student network 510 are trained by maximizing some sort of similarity (e.g., based on a loss function 514) between the student 510 output and the teacher 505 prediction.

In some embodiments, referring to FIGS. 5 and 6, in order to capture useful information from the teacher network 505, the samples (e.g., training data) may be augmented in the latent feature space (e.g., the hidden layers) of both the teacher network 505 and the student network 510 models (e.g., $f^T$ and $f^S$), and the student model (e.g., $f^S$) may be encouraged (e.g., based on the loss function 514) to have the same or similar predictions as that of the teacher model (e.g., $f^T$) for the augmented samples in the feature space. By combining the samples in the feature space (e.g., the hidden layers), new data may be created for which the ground truth data is not available. Thus, the teacher network 505 predictions may be regarded as the ground truth data (e.g., ground truth labels) for the augmented samples in the feature space during the training of the student network 510. As such, the student network 510 may be trained by minimizing or reducing a loss between the student network 510 and the teacher network 505 outputs based on the loss function 514.

In more detail, the student model (e.g., $f^S$) to be trained, which may be a reduced-sized version (e.g., in terms of parameters or weights) of a very large deep neural network, may be defined as $$f^S(x) = f_k^S\big(g_k^S(x)\big),$$

where $$g_k^S$$

denotes a part (e.g., nodes or layers) of the student neural network system 510 mapping the input data (e.g., x and x') to a hidden representation at layer k, which may be a hidden layer of the student network 510, and $$f_k^S$$

denotes a part (e.g., nodes or layers) of the student neural network system 510 mapping such hidden representation to an output $f^S(x)$ of the student network 510. Similarly, the pretrained teacher model (e.g., $f^T$) may be defined as $$f^T(x) = f_k^T\big(g_k^T(x)\big),$$

where $$g_k^T$$

denotes a part (e.g., nodes or layers) of the teacher neural network system 505 mapping the input data (e.g., x and x') to a hidden representation at layer k, which may be a hidden layer of the teacher network 505, and $$f_k^T$$

denotes a part (e.g., nodes or layers) of the teacher neural network system 505 mapping such hidden representation to an output $f^T(x)$ of the teacher network 505.

Training the student model $f^S$ using the augmented samples in the latent feature space (e.g., the hidden layers) may be performed by selecting a random hidden layer k from a set of eligible layers K in both the student and teacher networks 510 and 505. This set may include an input layer $$g_0^S(x), g_0^T(x).$$

Two random inputs (e.g., data minibatches) x and x' may be processed in each of the student and teacher networks 510 and 505, until reaching the layer k in both the student and teacher networks 510 and 505. In this case, the inputs x and x' may differ from each other only in the noise component, and their clean components may be the same as each other. In other words, the inputs x and x' may be defined as x=y+n, x'=y+n'. This provides two intermediate minibatches $$\big(g_k^S(x), g_k^S(x')\big) \text{ and } \big(g_k^T(x), g_k^T(x')\big).$$

Next, these intermediate mini-batches are combined (e.g., mixed) to generate a mixed mini-batch as defined in Equation 3, which correspond to mixed intermediate features of the inputs x and x' in the feature space (e.g., the hidden layers).

$$\bar{g}_k^S = h\big(g_k^S(x), g_k^S(x')\big) \text{ in the student network 510;} \qquad \text{Equation 3}$$

$$\text{and}$$

$$\bar{g}_k^T = h\big(g_k^T(x), g_k^T(x')\big) \text{ in the student network 505.}$$

A forward pass is continued from the respective layer k until the respective output in each of the student and teacher networks 510 and 505, using the mixed minibatch $$\bar{g}_k^S$$

in the student network 510 and the mixed minibatch $$\bar{g}_k^T$$

in the teacher network 505. The outputs $$f^S\!\left(\overline{g}_k^S\right) \text{ and } f^T\!\left(\overline{g}_k^T\right)$$

are used to compute the loss and gradients that update all the parameters (e.g., weights) of the student network 510, based on the loss function 514 as defined by a knowledge-distillation loss function $\mathcal{L}_{kd}(f^S)$ shown in Equation 4.

$$\mathcal{L}_{kd}(f^S) = \mathbb{E}_{x \sim P}\mathbb{E}_{x' \sim P}\mathbb{E}_{\lambda \sim Beta(\alpha,\alpha)}\mathbb{E}_{k \sim K} \qquad \text{Equation 4}$$
$$\left\| f^S\!\left(h\!\left(g_k^S(x),\, g_k^S(x')\right)\right) - f^T\!\left(h\!\left(g_k^T(x),\, g_k^T(x')\right)\right) \right\|_2^2$$

In some embodiments, the dataset including the inputs x and x' used to pre-train the teacher model $f^T$ may correspond to the augmented input data in the input space (e.g., the input layer), for example, which may be generated based on at least one of the methods 300 or 400 described above with reference to FIGS. 3A through 4B, and the student model $f^S$ may be trained during the knowledge distillation training as described above based on the inputs x and x' from the same augmented input data. In this case, after the teacher model's parameters are frozen (e.g., locked) as a result of the pretraining, the augmented input data used during the distillation training of the student model may be further mixed (e.g., augmented) in the latent feature space (e.g., the hidden layers) of both the teacher 505 and the student 510 models as described above, while the predictions of the teacher 505 thereon are used as kind of the ground truth data for the mixed data in the feature space. As such, in some embodiments, the predictions by the student 510 may be improved (e.g., according to the loss function 514) based on the predictions of the teacher 505 (e.g., as kind of the ground truth data) that is pretrained according to any suitable loss function $\mathcal{L}(f(x), y)$ and further trained based on the augmented input data, for example, as described above with reference to Equation 2.

In this case, by combining the loss based on the loss functions of Equations 2 and 4 above, and assuming that the loss function $\mathcal{L}(f(x), y)$ of Equation 2 corresponds to the CMGAN (conformer-based metric GAN for speech enhancement) loss function $\mathcal{L}_{cmgan}$, the loss function 514 used by the student network 510 during the knowledge distillation training may be defined as a combined loss function $\mathcal{L}(f^S)$ shown in Equation 5.

$$\mathcal{L}(f^S) = \mathbb{E}_{x,y \sim P}\mathcal{L}_{cmgan}(f^S(x), y)\mathbb{E}_{x,y \sim P} \qquad \text{Equation 5}$$
$$\mathbb{E}_{x' \sim P}\mathbb{E}_{\lambda \sim Beta(\alpha,\alpha)}\mathcal{L}_{cmgan}(f^S(h_\lambda(x, x')), y) + \gamma\mathcal{L}_{kd}(f^S)$$

In Equation 5, $\gamma$ is a hyper-parameter of the loss function $\mathcal{L}(f^S)$ that may be used to specify the extent of the mixing (e.g., of the inputs x and x') in the feature space (e.g., the hidden layers), similar to the hyper-parameter $\lambda$ in Equation 1 described above.

Figure 7A:
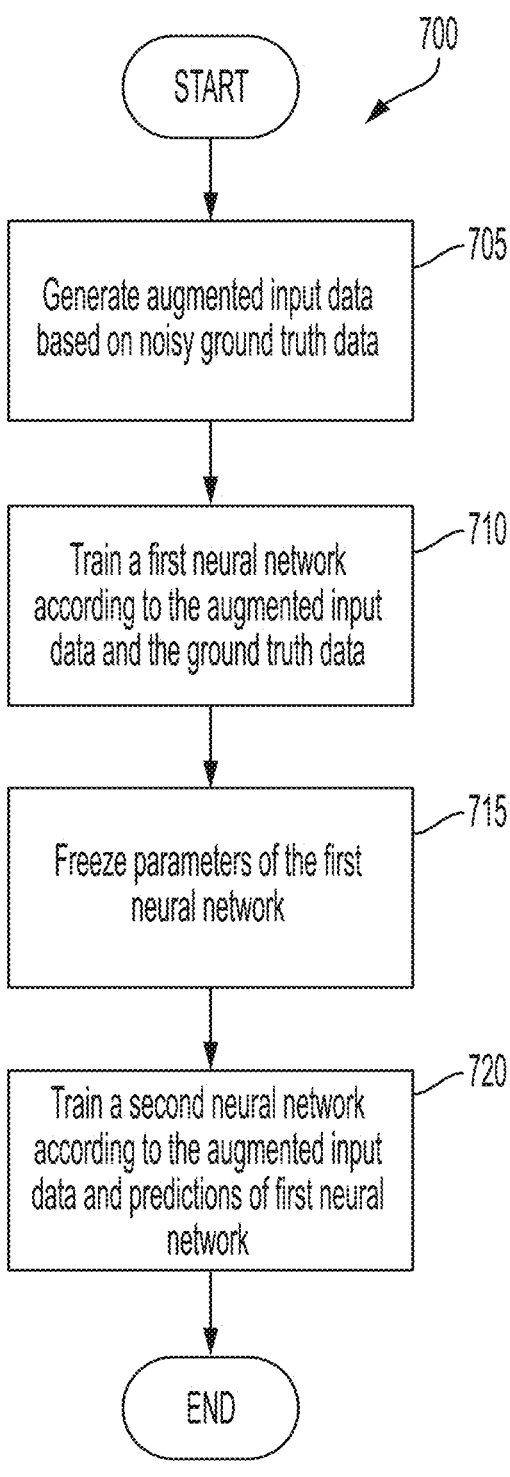
FIGS. 7A and 7B are flowcharts of a method for knowledge distillation, according to an embodiment.
Figure 7B:
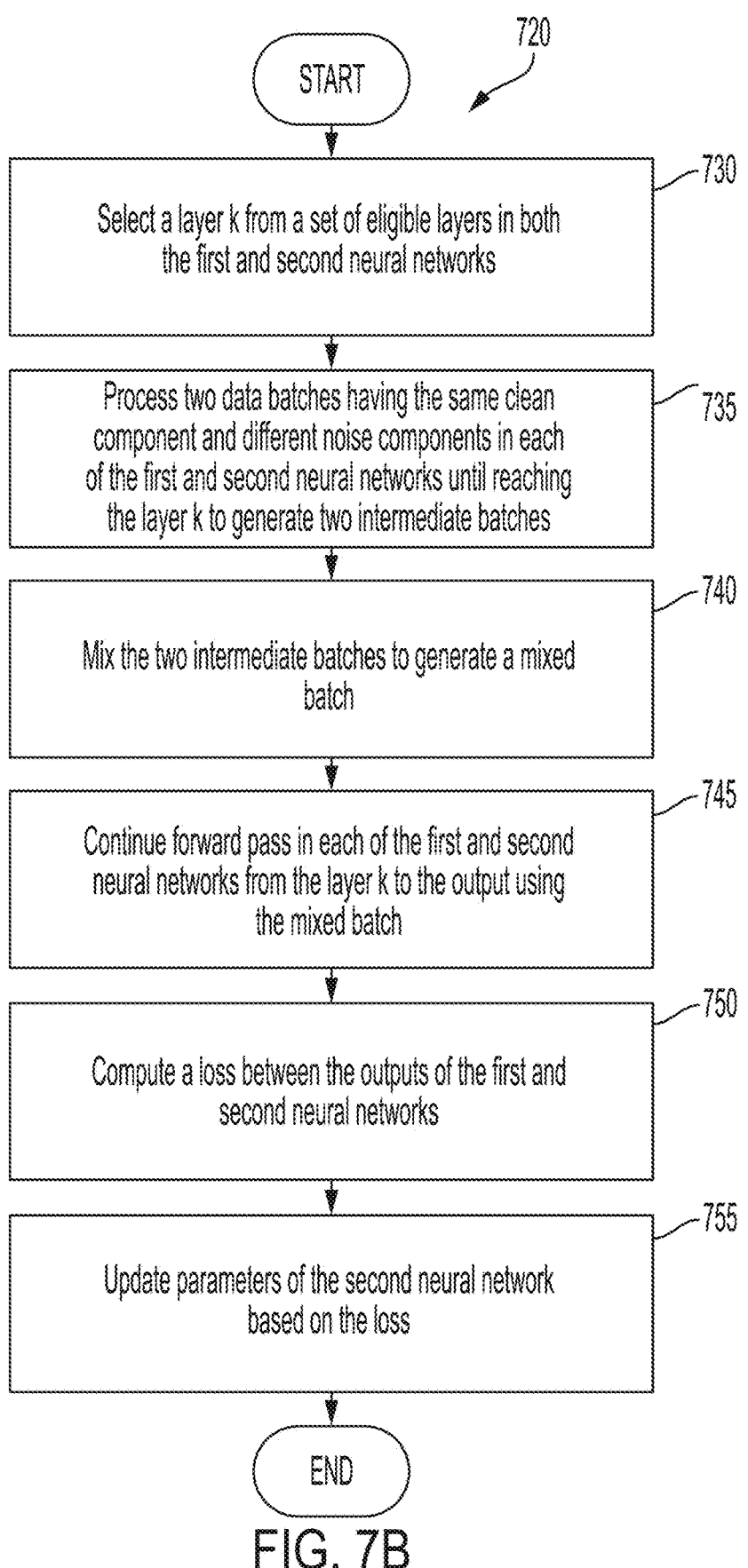

FIGS. 7A and 7B are flowcharts of a method for knowledge distillation, according to an embodiment. However, the present disclosure is not limited to the sequence or number of the operations of the methods 700 and 720 shown in FIGS. 7A and 7B, and can be altered into any desired sequence or number of operations as recognized by a person having ordinary skill in the art. For example, in some embodiments, the order may vary, some processes thereof may be performed concurrently or sequentially, or the methods 700 and 720 may include fewer or additional operations.

First, referring to FIG. 7A, the method 700 may start, and augmented input data may be generated based on noisy ground truth data at block 705. For example, in some embodiments, the augmented input data may be generated based on at least one of the methods 300 or 400 described above with reference to FIGS. 3A through 4B, but the present disclosure is not limited thereto, and the training data used to pretrain the teacher network 505 may include any suitable training data. In some embodiments, the augmented input data may be defined based on Equation 1 above, and may include the inputs x and x' (e.g., the data minibatches) as described above.

A first neural network (e.g., the teacher network 505) may be trained (e.g., pretrained) according to the augmented input data and the noisy ground truth data at block 710, for example, to output a first prediction of clean speech. Once sufficiently trained, parameters (e.g., weights) of the first neural network may be frozen (e.g., locked) at block 715. For example, the first neural network may be pretrained according to any suitable first loss function (e.g., the loss function $\mathcal{L}(f(x), y)$), and retrained on the augmented input data according to a second loss function (e.g., the noise-mix loss function $\mathcal{L}_{noiseMix}(f)$) based on the first loss function and the noisy ground truth data, for example, as discussed above with reference to Equation 2.

A second neural network (e.g., the student network 510) may be trained according to the augmented input data (e.g., generated at block 705) and predictions of the first neural network (e.g., as a kind of the ground truth data) at block 720, for example, to output a second prediction of the clean speech, and the method 700 may end. For example, the second neural network may be trained based on a third loss function (e.g., the knowledge-distillation loss function $\mathcal{L}_{kd}$ $(f^S)$ or the combined loss function $\mathcal{L}(f^S)$) and the predictions of the first neural network as described above with reference to at least one of Equation 4 or Equation 5. In some embodiments, once the second neural network is sufficiently trained, its parameters (e.g., weights) may be frozen (e.g., locked), and it may generate suitable predictions (e.g., clean speech labels) on live data during inference. The predictions (e.g., the clean speech labels) of the second neural network may then be used to output an audio signal corresponding to the clean speech labels, for example, in mobile phones, smart phones, wearable devices, hearing aids, and the like.

In more detail, referring to FIG. 7B, to train the second neural network at block 720 of the method 700, the one or more processors of the first and second neural networks may select a layer k from a set of eligible layers (e.g., hidden layers) in both the first and second neural networks at block 730. For example, the one or more processors of the first neural network may select the layer k from among its hidden layers, which include a corresponding input layer $$\left(\text{e.g., } g_0^T(x)\right).$$

The one or more processors of the second neural network may select the same corresponding layer k from among its hidden layers, which also includes a corresponding input layer $$\left(\text{e.g., } g_0^S(x)\right).$$

Two data batches having the same clean component and different noise components may be processed in each of the first and second neural networks until reaching the layer k to generate two intermediate batches at block 735. For example, the one or more processors of the first neural network may process inputs (e.g., x and x') from among the two data batches corresponding to its input layer $$\left(\text{e.g., } g_0^T(x)\right)$$

until reaching the layer k from among its hidden layers, to generate two intermediate batches (e.g., the two minibatches $$\left(g_k^T(x), g_k^T(x')\right)$$

Similarly, the one or more processors of the second neural network may process the inputs (e.g., x and x') from among the two data batches corresponding to its input layer $$\left(\text{e.g., } g_0^S(x)\right)$$

until reaching the layer k from among its hidden layers, to generate two intermediate batches (e.g., the two minibatches $$\left(g_k^S(x), g_k^S(x')\right)$$

The two intermediate batches may be mixed to generate a mixed batch at block 740. For example, the one or more processors of the first neural network may mix the two intermediate batches (e.g., the two minibatches $$\left(g_k^T(x), g_k^T(x')\right)$$

to generate the mixed batch (e.g., $$\left(\text{e.g., } \overline{g}_k^T = h\left(g_k^T(x), g_k^T(x')\right)\right).$$

Similarly, the one or more processors of the second neural network may mix the two intermediate batches (e.g., the two minibatches $$\left(g_k^S(x), g_k^S(x')\right)$$

to generate the mixed batch $$\left(\text{e.g., } \overline{g}_k^S = h\left(g_k^S(x), g_k^S(x')\right)\right).$$

A forward pass is continued in each of the first and second neural networks from the layer k to the output using the mixed batch at block 745. For example, the one or more processors of the first neural network may continue the forward pass from its layer k to the output using the mixed batch $$\left(\text{e.g., } \overline{g}_k^T = h\left(g_k^T(x), g_k^T(x')\right)\right).$$

Similarly, the one or more processors of the second neural network may continue the forward pass from its layer k to the output using the mixed batch $$\left(\text{e.g., } \overline{g}_k^S = h\left(g_k^S(x), g_k^S(x')\right)\right).$$

A loss is computed between the outputs of the first and second neural networks at block 750. For example, the one or more processors of the second neural network may compute a loss between a prediction output $$\left(\text{e.g., } f^T\left(\overline{g}_k^T\right)\right)$$

by the first neural network and an output (e.g., $$\left(\text{e.g., } f^S\left(\overline{g}_k^S\right)\right)$$

of the second neural network based on the third loss function (e.g., the knowledge-distillation loss function $\mathcal{L}_{kd}(f^S)$ or the combined loss function $\mathcal{L}(f^S)$ as described above.

Parameters (e.g., weights) of the second neural network may be updated based on the loss at block 755, and the method of block 725 may end. As described above, once the second neural network is sufficiently trained, its parameters (e.g., weights) may be frozen (e.g., locked), so that it may generate suitable predictions (e.g., clean speech labels) on live data during inference.

As such, the second neural network, which may be a smaller sized version of the first neural network in terms of parameters (e.g., weights), may be sufficiently trained according to the third loss function (e.g., the knowledge-distillation loss function $\mathcal{L}_{kd}(f^S)$ or the combined loss function $\mathcal{L}(f^S)$) and predictions of the first neural network, by distilling knowledge learned by the first neural network that is pretrained based on any suitable first loss function (e.g., the loss function $\mathcal{L}(f(x), y)$) and further trained on the augmented input data according to a second loss function (e.g., the noise-mix loss function $\mathcal{L}_{noiseMix}(f)$).

FIG. 8 is a table illustrating experimental results of a knowledge distillation artificial neural network system according to an embodiment.

Referring to FIG. 8, experimental results from training two student models (e.g., Tiny-CMGAN and Super-Tiny-CMGAN) based on knowledge distilled from a larger teacher model (e.g., Large-CMGAN) based on the method 700 described above with reference to FIGS. 7A and 7B are shown. The models are trained based on a VoiceBank-DEMAND augmented input dataset generated by mixing the VoiceBank Corpus and DEMAND dataset (e.g., based on at least one of the methods 300 or 400 described above). Five objective measures are evaluated, namely, Perceptual Evaluation of Speech Quality (PESQ) with a score ranging from −0.5 to 4.5, which is used to evaluate speech quality, Short-time objective intelligibility (STOI) with a score ranging from 0 to 100, which is used for speech intelligibility, and three mean opinion score (MOS)-based measures having scores ranging from 1 to 5. The three MOS-based measures include CSIG, which is the MOS prediction of the signal distortion, CBAK, which is the MOS prediction of the noise intrusiveness, and COVL, which is the MOS prediction of the overall signal quality.

The teacher model Large-CMGAN is pretrained according to the original CMGAN model (e.g., the CMGAN loss function $\mathcal{L}_{cmgan}$), and retrained according to the noise-mix loss function $\mathcal{L}_{noiseMix}(f)$ described above with reference to FIG. 2, before the parameters of the teacher model are frozen (e.g., locked) for utilization of the teacher's predictions to train the student models Tiny-CMGAN and Super-Tiny-CMGAN. For example, as illustrated in FIG. 8, the teacher model Large-CMGAN includes 64 channels, resulting in 1830K trainable parameters. The student model Tiny-CM-GAN has 16 channels, resulting in a reduction of the number of trainable parameters from 1830K to 149K. The student model Super-Tiny-CMGAN has 12 channels, resulting in a further reduction of the number of trainable parameters from 1830K to 93K.

As illustrated in FIG. 8, training the CMGAN models (Large-CMGAN Tiny-CMGAN, and Super-Tiny-CMGAN) by augmenting the input training data according to Equation 1 described above may improve the performance of the CMGAN models. Further, training the CMGAN-Tiny and CMGAN-Super-Tiny models according to the knowledge distillation loss function $\mathcal{L}_{kd}(f^S)$ described above with reference to Equation 4 may improve their performance compared to the vanilla CMGAN loss function. Moreover, training the CMGAN-Tiny and CMGAN-Super-Tiny models according to the combined loss function $\mathcal{L}(f^S)$ described above with reference to Equation 5 may further improve the performance of the CMGAN-Tiny and CMGAN-Super-Tiny models compared to applying the noise-mix loss function $\mathcal{L}_{noiseMix}(f)$ described above with reference to Equation 2 and the knowledge distillation loss function $\mathcal{L}_{kd}(f^S)$ described above with reference to Equation 4 individually.

Figure 9:
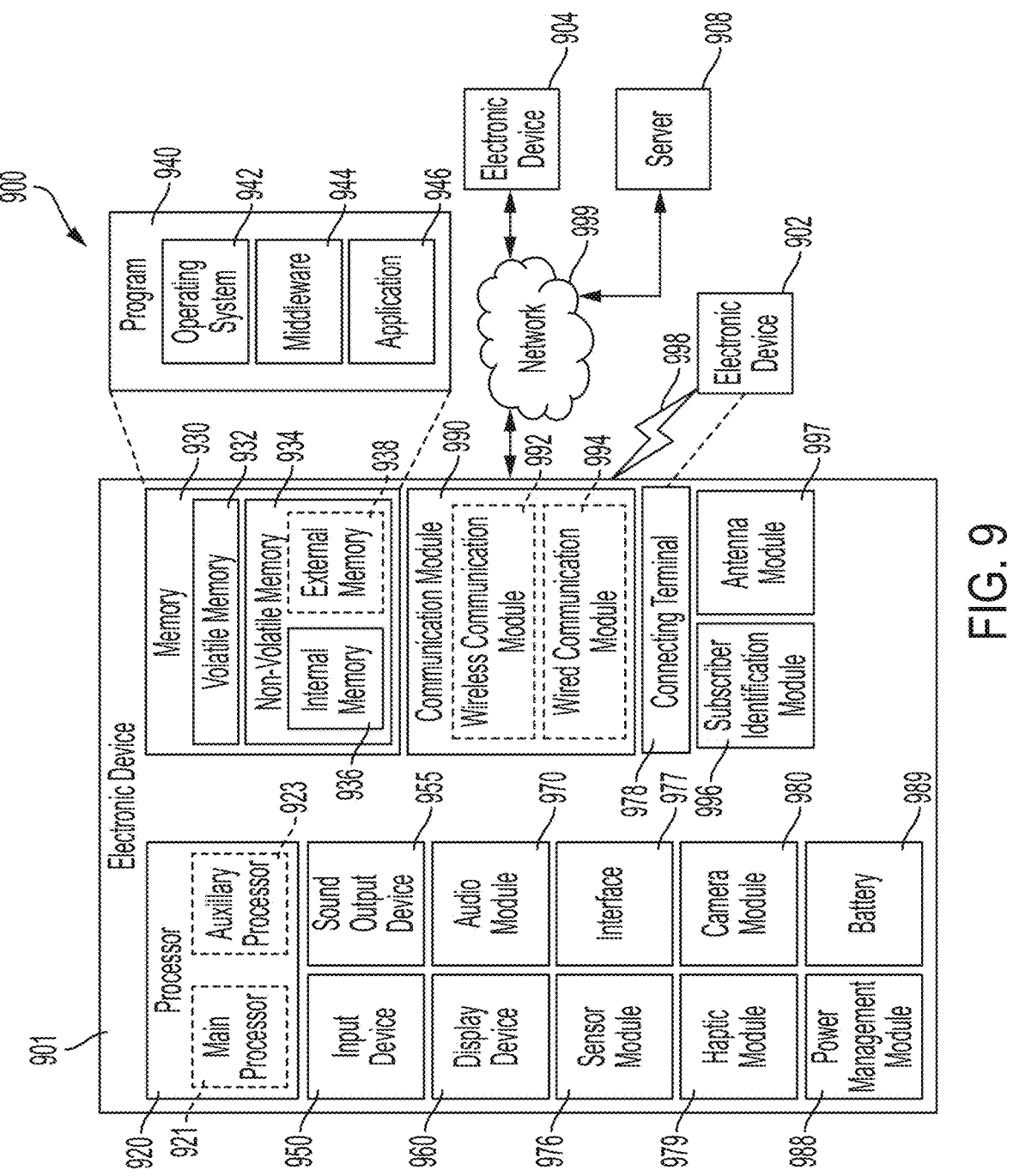
FIG. 9 is a block diagram of an electronic device in a network environment, according to an embodiment.

FIG. 9 is a block diagram of an electronic device in a network environment, according to an embodiment.

Referring to FIG. 9, an electronic device 901 in a network environment 900 may communicate with an electronic device 902 via a first network 998 (e.g., a short-range wireless communication network), or an electronic device 904 or a server 908 via a second network 999 (e.g., a long-range wireless communication network). The electronic device 901 may communicate with the electronic device 904 via the server 908. The electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) card 996, or an antenna module 997. In one embodiment, at least one (e.g., the display device 960 or the camera module 980) of the components may be omitted from the electronic device 901, or one or more other components may be added to the electronic device 901. Some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute software (e.g., a program 940) to control at least one other component (e.g., a hardware or a software component) of the electronic device 901 coupled with the processor 920 and may perform various data processing or computations.

As at least part of the data processing or computations, the processor 920 may load a command or data received from another component (e.g., the sensor module 976 or the communication module 990) in volatile memory 932, process the command or the data stored in the volatile memory 932, and store resulting data in non-volatile memory 934. The processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). The auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934. Non-volatile memory 934 may include internal memory 936 and/or external memory 938.

The program 940 may be stored in the memory 930 as software, and may include, for example, an operating system (OS) 942, middleware 944, or an application 946.

The input device 950 may receive a command or data to be used by another component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. The display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. The audio module 970 may obtain the sound via the input device 950 or output the sound via the sound output device 955 or a headphone of an external electronic device 902 directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wired) or wirelessly. The interface 977 may include, for example, a high-definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. The connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. The haptic module 979 may include, for example, a motor, a piezoelectric element, or an electrical stimulator.

The camera module 980 may capture a still image or moving images. The camera module 980 may include one or more lenses, image sensors, image signal processors, or flashes. The power management module 988 may manage power supplied to the electronic device 901. The power management module 988 may be implemented as at least part of, for example, a power management integrated circuit (PMIC).

The battery 989 may supply power to at least one component of the electronic device 901. The battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. The communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as BLUETOOTH™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. The antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

Commands or data may be transmitted or received between the electronic device 901 and the external electronic device 904 via the server 908 coupled with the second network 999. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

Figure 10:
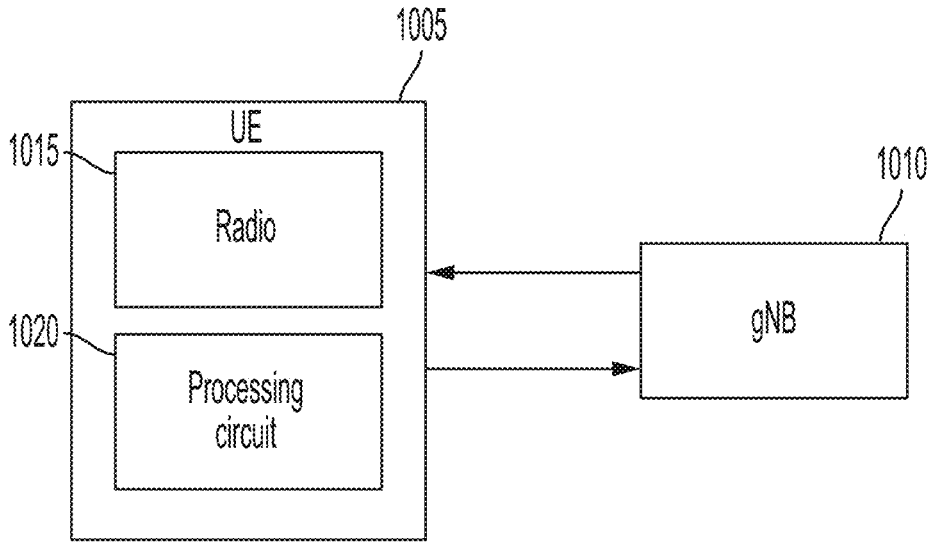
FIG. 10 shows a system including a UE and a gNB in communication with each other, according to an embodiment.

FIG. 10 shows a system including a UE and a gNB in communication with each other, according to an embodiment.

Referring to FIG. 10, the UE may include a radio 1015 and a processing circuit (or a means for processing) 1020, which may perform various methods disclosed herein, e.g., at least one of the methods illustrated in FIG. 3B, 4B, 7A, or 7B. For example, the processing circuit 1020 may receive, via the radio 1015, transmissions from the network node (gNB) 1010, and the processing circuit 1020 may transmit, via the radio 1015, signals to the gNB 1010.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A system comprising:
one or more processors; and
memory comprising instructions that, when executed by the one or more processors, cause the one or more processors to:
generate augmented input data by mixing noise components corresponding to at least two noise spectrograms, each of the at least two noise spectrograms being associated with its corresponding clean spectrogram of samples of training data, and adding the mixed noise components to a clean component corresponding to a clean spectrogram of a sample of the training data;
train a first neural network based on the augmented input data and ground truth data of the training data to output a first prediction of clean speech;
lock trainable parameters of the first neural network as a result of the training of the first neural network; and
train a second neural network according to the augmented input data and predictions of the first neural network to output a second prediction of the clean speech.

2. The system of claim 1, wherein a number of trainable parameters in the second neural network is smaller than a number of the trainable parameters in the first neural network.

3. The system of claim 1, wherein the first neural network is trained according to a first loss function and a second loss function.

4. The system of claim 3, wherein the second loss function is based on the first loss function and a hyper-parameter that defines an extent of the mixing of the noise components of the training data.

5. The system of claim 3, wherein the second neural network is trained according to a third loss function different from the first and second loss functions.

6. The system of claim 1, wherein to train the second neural network, the instructions further cause the one or more processors to mix intermediate features of input data at a hidden layer of each of the first and second neural networks to generate a batch of mixed intermediate features of the input data for each of the first and second neural networks.

7. The system of claim 6, wherein to train the second neural network, the instructions further cause the one or more processors to continue a forward pass from the hidden layer of each of the first and second neural networks to a corresponding output of each of the first and second neural networks using the batch of mixed intermediate features.

8. The system of claim 7, wherein to train the second neural network, the instructions further cause the one or more processors to:

calculate a loss between the corresponding output of the second neural network and the corresponding output of the first neural network, based on the mixed batch of intermediate features; and adjust trainable parameters of the second neural network based on the loss.

9. A method comprising:

generating, by one or more processors, augmented input data by mixing noise components corresponding to at least two noise spectrograms, each of the at least two noise spectrograms being associated with its corresponding clean spectrogram of samples of training data, and adding the mixed noise components to a clean component corresponding to a clean spectrogram of a sample of the training data;

training, by the one or more processors, a first neural network based on the augmented input data and ground truth data of the training data to output a first prediction of clean speech;

locking, by the one or more processors, trainable parameters of the first neural network as a result of the training of the first neural network; and training, by the one or more processors, a second neural network according to the augmented input data and predictions of the first neural network to output a second prediction of the clean speech.

10. The method of claim 9, wherein a number of trainable parameters in the second neural network is smaller than a number of the trainable parameters in the first neural network.

11. The method of claim 9, wherein the first neural network is trained according to a first loss function and a second loss function.

12. The method of claim 11, wherein the second loss function is based on the first loss function and a hyperparameter that defines an extent of the mixing of the noise components of the training data.

13. The method of claim 11, wherein the second neural network is trained according to a third loss function different from the first and second loss functions.

14. The method of claim 9, wherein to train the second neural network, the method further comprises mixing, by the one or more processors, intermediate features of input data at a hidden layer of each of the first and second neural networks to generate a batch of mixed intermediate features of the input data for each of the first and second neural networks.

15. The method of claim 14, wherein to train the second neural network, the method further comprises continuing, by the one or more processors, a forward pass from the hidden layer of each of the first and second neural networks to a corresponding output of each of the first and second neural networks using the batch of mixed intermediate features.

16. The method of claim 15, wherein to train the second neural network, the method further comprises:

calculating, by the one or more processors, a loss between the corresponding output of the second neural network and the corresponding output of the first neural network, based on the mixed batch of intermediate features; and adjusting, by the one or more processors, trainable parameters of the second neural network based on the loss.

17. A computer-readable medium storing instructions that, when executed by one or more processors, cause the one or more processors to perform a method comprising:

generating augmented input data by mixing noise components corresponding to at least two noise spectrograms, each of the at least two noise spectrograms being associated with its corresponding clean spectrogram of samples of training data, and adding the mixed noise components to a clean component corresponding to a clean spectrogram of a sample of the training data;

training a first neural network based on the augmented input data and ground truth data of the training data to output a first prediction of clean speech;

locking trainable parameters of the first neural network as a result of the training of the first neural network; and training a second neural network according to the augmented input data and predictions of the first neural network to output a second prediction of the clean speech.

18. The computer-readable medium of claim 17, wherein to train the second neural network, the instructions further cause the one or more processors to perform the method comprising mixing the augmented input data in a hidden layer of each of the first and second neural networks to generate a mixed batch of intermediate features of the augmented input data.

19. The computer-readable medium of claim 18, wherein to train the second neural network, the instructions further cause the one or more processors to perform the method comprising continuing a forward pass from the hidden layer of each of the first and second neural networks to a corresponding output of each of the first and second neural networks using the mixed batch of intermediate features.

20. The computer-readable medium of claim 19, wherein to train the second neural network, the instructions further cause the one or more processors to perform the method comprising:

calculating a loss between the corresponding output of the second neural network and the corresponding output of the first neural network, based on the mixed batch of intermediate features; and adjusting trainable parameters of the second neural network based on the loss.

* * * * *